United States Patent
Kimoto

(10) Patent No.: US 10,877,764 B2
(45) Date of Patent: Dec. 29, 2020

(54) VECTOR PROCESSOR, OPERATION PERFORMING METHOD, AND NON-TRANSITORY COMPUTER-READABLE RECORDING MEDIUM FOR RECORDING PROGRAM

(71) Applicant: NEC Corporation, Tokyo (JP)

(72) Inventor: Kei Kimoto, Tokyo (JP)

(73) Assignee: NEC CORPORATION, Tokyo (JP)

(*) Notice: Subject to any disclaimer, the term of this patent is extended or adjusted under 35 U.S.C. 154(b) by 8 days.

(21) Appl. No.: 16/292,554

(22) Filed: Mar. 5, 2019

(65) Prior Publication Data

US 2019/0278606 A1 Sep. 12, 2019

(30) Foreign Application Priority Data

Mar. 8, 2018 (JP) ................................. 2018-041432

(51) Int. Cl.
*G06F 9/38* (2018.01)
*G06F 9/30* (2018.01)
*G06F 15/80* (2006.01)

(52) U.S. Cl.
CPC ........ *G06F 9/3836* (2013.01); *G06F 9/30101* (2013.01); *G06F 15/8053* (2013.01)

(58) Field of Classification Search
None
See application file for complete search history.

(56) References Cited

U.S. PATENT DOCUMENTS

| 2009/0240757 A1* | 9/2009 | Yoshida | G06F 9/30112 708/513 |
| 2010/0146238 A1* | 6/2010 | Rakib | G06F 12/0284 711/200 |
| 2012/0124332 A1* | 5/2012 | Yi | G06F 9/30149 712/3 |

(Continued)

FOREIGN PATENT DOCUMENTS

| JP | H10-312374 A | 11/1998 |
| JP | 2005-275626 A | 10/2005 |

(Continued)

OTHER PUBLICATIONS

Japanese Office Action for JP Application No. 2018-041432 dated Sep. 17, 2019 with English Translation.

(Continued)

*Primary Examiner* — Eric Coleman

(57) ABSTRACT

A vector processor includes: a temporary storage device configured to retain a plurality of elements representing data used at the time of performing an operation appropriate for an instruction; a data type determining part configured to determine what data type the elements retained by the temporary storage device are to be handled as among predetermined data types, in accordance with the instruction; and an output destination deciding part configured to decide an output destination of each of the elements stored by the temporary storage device, based on the result of determination by the data type determining part. The vector processor is configured to output each of the elements to the output destination decided by the output destination deciding part, thereby performing the operation.

9 Claims, 20 Drawing Sheets

(56) References Cited

U.S. PATENT DOCUMENTS

| | | | |
|---|---|---|---|
| 2014/0006755 A1* | 1/2014 | Gueron | G06F 7/52 |
| | | | 712/222 |
| 2014/0047214 A1* | 2/2014 | Fleischer | G06F 9/30109 |
| | | | 712/205 |
| 2014/0289300 A1 | 9/2014 | Ajima | |
| 2016/0179531 A1* | 6/2016 | Gschwind | G06F 9/30025 |
| | | | 712/7 |
| 2018/0203692 A1* | 7/2018 | Stephens | G06F 9/30014 |

FOREIGN PATENT DOCUMENTS

| | | | |
|---|---|---|---|
| JP | 2009-230339 A | 10/2009 | |
| JP | 2012-103959 A | 5/2012 | |
| JP | 2014-186461 A | 10/2014 | |

OTHER PUBLICATIONS

Sinharoy, B., et.al., "IBM POWER7 Multicore Server Processor", IBM Journal of Research and Development, NY, United States, IBM, Apr. 29, 2011, vol. 55, No. 3, pp. 1:3, 1:13-1:16, DOI:10.1147/JRD.2011.2127330, 7 pages total.

IBM, "z/Architecture Principles of Operation", NY, United States, Sep. 2017, Twelfth Edition, pp. 19-2, 21-1, 21-15, 24-39, 24-40, 24-41, SA22-7832-11, 8 pages total.

Communication dated Mar. 12, 2019 issued by the Japanese Patent Office in counterpart application No. 2018-041432, Concise explanation of the relevance.

\* cited by examiner

FIG. 3

· ONE ELEMENT, 1 BYTE

| VR0 E000 | VR0 E001 | VR0 E002 | VR0 E003 | VR0 E004 | VR0 E005 | VR0 E006 | VR0 E007 | VR0 E008 | VR0 E009 | VR0 E010 | VR0 E011 | VR0 E012 | VR0 E013 | VR0 E014 | VR0 E015 | VR0 E016 | VR0 E017 | ...... | VR0 E253 | VR0 E254 | VR0 E255 |

FIG. 4

· HALF PRECISION

| VR0 E000 | VR0 E001 | VR0 E002 | VR0 E003 | VR0 E004 | VR0 E005 | VR0 E006 | VR0 E007 | VR0 E008 | VR0 E009 | VR0 E010 | VR0 E011 | VR0 E012 | VR0 E013 | VR0 E014 | VR0 E015 | VR0 E016 | VR0 E017 | ... | VR0 E253 | VR0 E254 | VR0 E255 |

| VR0 E000 | VR0 E001 | VR0 E002 | VR0 E003 | VR0 E004 | VR0 E005 | VR0 E006 | VR0 E007 | VR0 E008 | ... | VR0 E127 |

FIG. 5

- SINGLE PRECISION

| VR0 E000 | VR0 E001 | VR0 E002 | VR0 E003 | VR0 E004 | VR0 E005 | VR0 E006 | VR0 E007 | VR0 E008 | VR0 E009 | VR0 E010 | VR0 E011 | VR0 E012 | VR0 E013 | VR0 E014 | VR0 E015 | VR0 E016 | VR0 E017 | ..... | VR0 E253 | VR0 E254 | VR0 E255 |

| VR0 E000 | VR0 E001 | VR0 E002 | VR0 E003 | ..... | VR0 E063 |

FIG. 8

· FRACTION (a/b)

| VR0 E000 | VR0 E001 | VR0 E002 | VR0 E003 | VR0 E004 | VR0 E005 | VR0 E006 | VR0 E007 | VR0 E008 | VR0 E009 | VR0 E010 | VR0 E011 | VR0 E012 | VR0 E013 | VR0 E014 | VR0 E015 | VR0 E016 | VR0 E017 | ..... | VR0 E253 | VR0 E254 | VR0 E255 |

FRACTION
a
b

| VR0 E000 | VR0 E001 |

FIG. 9

• COMPLEX NUMBER (a+bi)

| VR0 E000 | VR0 E001 | VR0 E002 | VR0 E003 | VR0 E004 | VR0 E005 | VR0 E006 | VR0 E007 | VR0 E008 | VR0 E009 | VR0 E010 | VR0 E011 | VR0 E012 | VR0 E013 | VR0 E014 | VR0 E015 | VR0 E016 | VR0 E017 | ...... | VR0 E253 | VR0 E254 | VR0 E255 |

COMPLEX NUMBER a b

| VR0 E000 | VR0 E001 |

FIG. 12

$\cdot 4 \times 4$ MATRIX $\begin{pmatrix} a & b & c & d \\ e & f & g & h \\ i & j & k & l \\ m & n & o & p \end{pmatrix}$

| | a | b | c | d | e | f | g | h | i | j | k | l | m | n | o | p | | | |
|---|---|---|---|---|---|---|---|---|---|---|---|---|---|---|---|---|---|---|---|
| VR0 E000 | VR0 E001 | VR0 E002 | VR0 E003 | VR0 E004 | VR0 E005 | VR0 E006 | VR0 E007 | VR0 E008 | VR0 E009 | VR0 E010 | VR0 E011 | VR0 E012 | VR0 E013 | VR0 E014 | VR0 E015 | VR0 E016 | VR0 E017 | ...... | VR0 E253 | VR0 E254 | VR0 E255 |

$2 \times 2$ MATRIX

| a | b | c | d | e | f | g | h | i | j | k | l | m | n | o | p |
|---|---|---|---|---|---|---|---|---|---|---|---|---|---|---|---|
| VR0 E000 | VR0 E001 | VR0 E002 | VR0 E003 | VR0 E004 | VR0 E005 | VR0 E006 | VR0 E007 | VR0 E000 | VR0 E001 | VR0 E002 | VR0 E003 | VR0 E004 | VR0 E005 | VR0 E006 | VR0 E007 |

VECTOR PROCESSOR, OPERATION PERFORMING METHOD, AND NON-TRANSITORY COMPUTER-READABLE RECORDING MEDIUM FOR RECORDING PROGRAM

INCORPORATION BY REFERENCE

This application is based upon and claims the benefit of priority from Japanese patent application No. 2018-041432, filed on Mar. 8, 2018, the disclosure of which is incorporated herein in its entirety by reference.

TECHNICAL FIELD

The present invention relates to a vector processor, an operation performing method, and a non-transitory computer-readable recording medium for recording a program.

BACKGROUND ART

A vector processor that performs an operation using data stored in a vector register is known.

One example of such a technique is shown in, for example, Patent Document 1. In Patent Document 1, a vector operation processing device for enabling operation processing with two or more elements in one machine cycle is described. To be specific, the vector operation processing device has a distributing means and a processed-element-number controlling means. According to Patent Document 1, the distributing means provides a vector operation unit with operand vector data. Moreover, the processed-element-number controlling means indicates the number of operand vector data that can be processed per machine cycle to the distributing means, and also instructs operation processing to a number of vector operation units that corresponds to the number of operand vector data that can be processed per machine cycle.

Patent Document 1: Japanese Unexamined Patent Application Publication No. JP-A H10-312374 (1998)

In the case of performing an operation using the vector operation processing device (vector processor) as described in Patent Document 1, two operands are required in general. For example, when two operands are loaded from a memory (8 bytes×2) and an operation result is written into the memory (8 bytes), 24-byte memory read and memory write occurs. Although the number of operations performed during the above is only one, a B/F (Byte/Flop) value required in such an operation is 24 actually.

On the other hand, a B/F value of a general cutting-edge computer is 0.5 or less, so that there is a large difference between the required B/F value and the actual B/F value. As a result, for example, in the case of the program as described above that repeats a simple operation such as reading an operand A and an operand B from a memory and writing an operation result C into the memory, there has been a problem that performance can be hardly exerted and the operation unit resources of a CPU are wasted in most of the time. In other words, there has been a problem that it is difficult to efficiently use an operation unit to enhance performance in a vector processor.

SUMMARY OF THE INVENTION

Accordingly, an object of the present invention is to provide a vector processor, an operation performing method and a non-transitory computer-readable recording medium for recording a program that solve the problem that it is difficult to efficiently use an operation unit to enhance performance in a vector processor.

In order to achieve the object, a vector processor as an aspect of the present invention includes: a temporary storage device configured to retain a plurality of elements representing data used at a time of performing an operation appropriate for an instruction; a data type determining part configured to determine what data type the elements retained by the temporary storage device are to be handled as among predetermined data types, in accordance with the instruction; and an output destination deciding part configured to decide an output destination of each of the elements stored by the temporary storage device, based on a result of determination by the data type determining part. The vector processor is configured to output each of the elements to the output destination decided by the output destination deciding part, thereby performing the operation.

Further, an operation performing method as another aspect of the present invention is an operation performing method executed by a vector processor including a temporary storage device configured to retain a plurality of elements representing data used at a time of performing an operation appropriate for an instruction. The operation performing method includes: determining what data type the elements retained by the temporary storage device are to be handled as among predetermined data types, in accordance with the instruction; deciding an output destination of each of the elements stored by the temporary storage device, based on a result of determination by the data type determining part; and outputting each of the elements the output destination decided by the output destination deciding part, thereby performing the operation.

Further, a non-transitory computer-readable recording medium for recording a program as another aspect of the present invention is a non-transitory computer-readable recording medium for recording a program including instructions for causing a vector processor including a temporary storage device configured to retain a plurality of elements representing data used at a time of performing an operation appropriate for an instruction, to realize: a data type determining part configured to determine what data type the elements retained by the temporary storage device are to be handled as among predetermined data types, in accordance with the instruction; and an output destination deciding part configured to decide an output destination of each of the elements stored by the temporary storage device, based on a result of determination by the data type determining part. The program includes instructions for causing the vector processor to output each of the elements to the output destination decided by the output destination deciding part, thereby performing the operation.

The present invention with the configurations as described above can provide a vector processor, an operation performing method and a non-transitory computer-readable recording medium for recording a program that solve the problem that it is difficult to efficiently use an operation unit to enhance performance in a vector processor.

BRIEF DESCRIPTION OF DRAWINGS

FIG. 3 is a view showing a case where one element is 1 byte;

FIG. 4 is a view in which two elements are collectively handled as one element to express half precision;

FIG. 5 is a view in which four elements are collectively handled as one element to express single precision;

FIG. 8 is a view in which two elements are collectively handled as one element to express a fraction;

FIG. 9 is a view in which two elements are collectively handled as one element to express a complex number;

FIG. 12 is a view in which sixteen elements are handled as one element to express a 4×4 matrix;

EXAMPLE EMBODIMENT

First Example Embodiment

Figure 1:
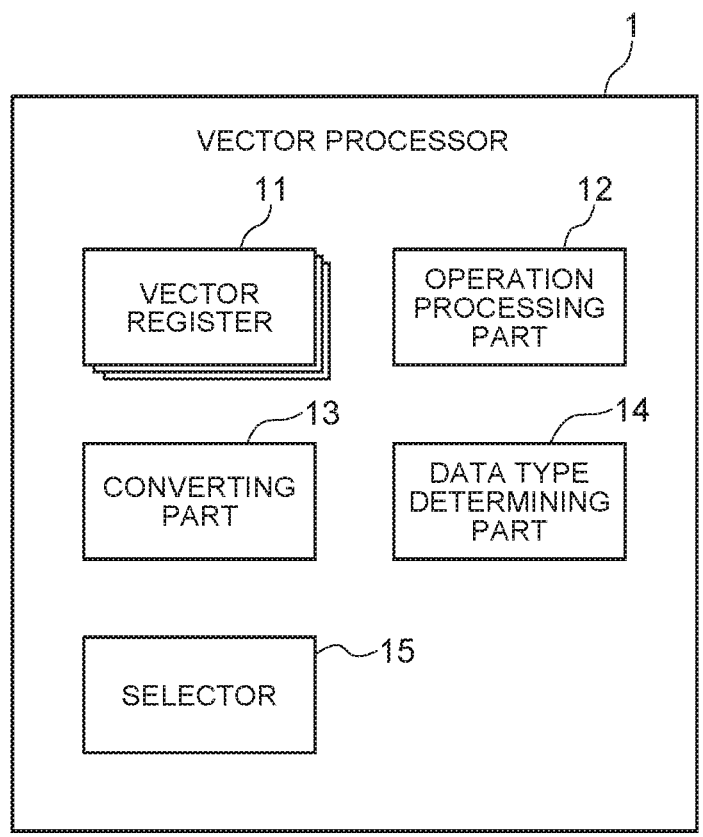
FIG. 1 a block diagram showing an example of the configuration of a vector processor according to a first example embodiment of the present invention.
Figure 2:
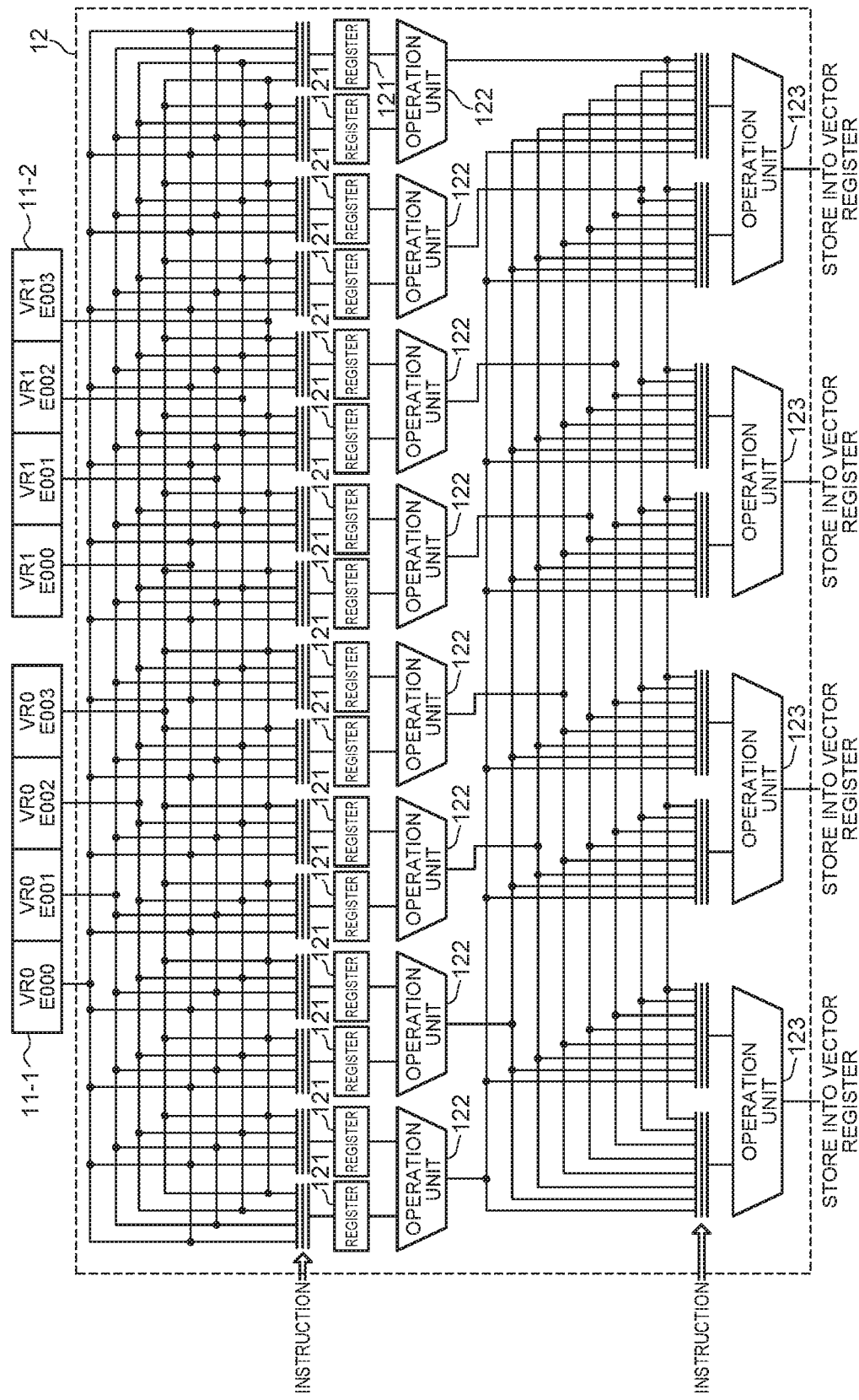
FIG. 2 is a diagram showing an example of the configuration of an operation processing part shown in FIG. 1.
Figure 13:
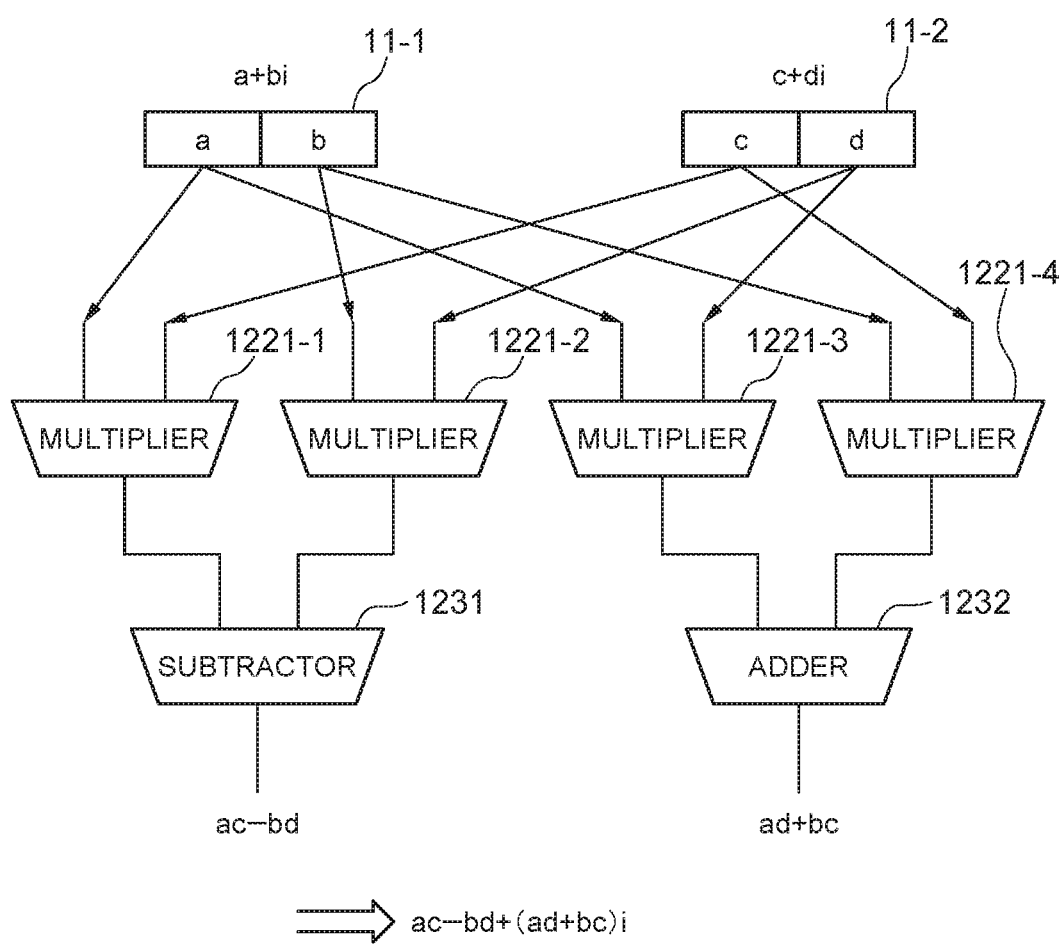
FIG. 13 is a diagram for describing an example of processing when performing multiplication of complex numbers.
Figure 14:
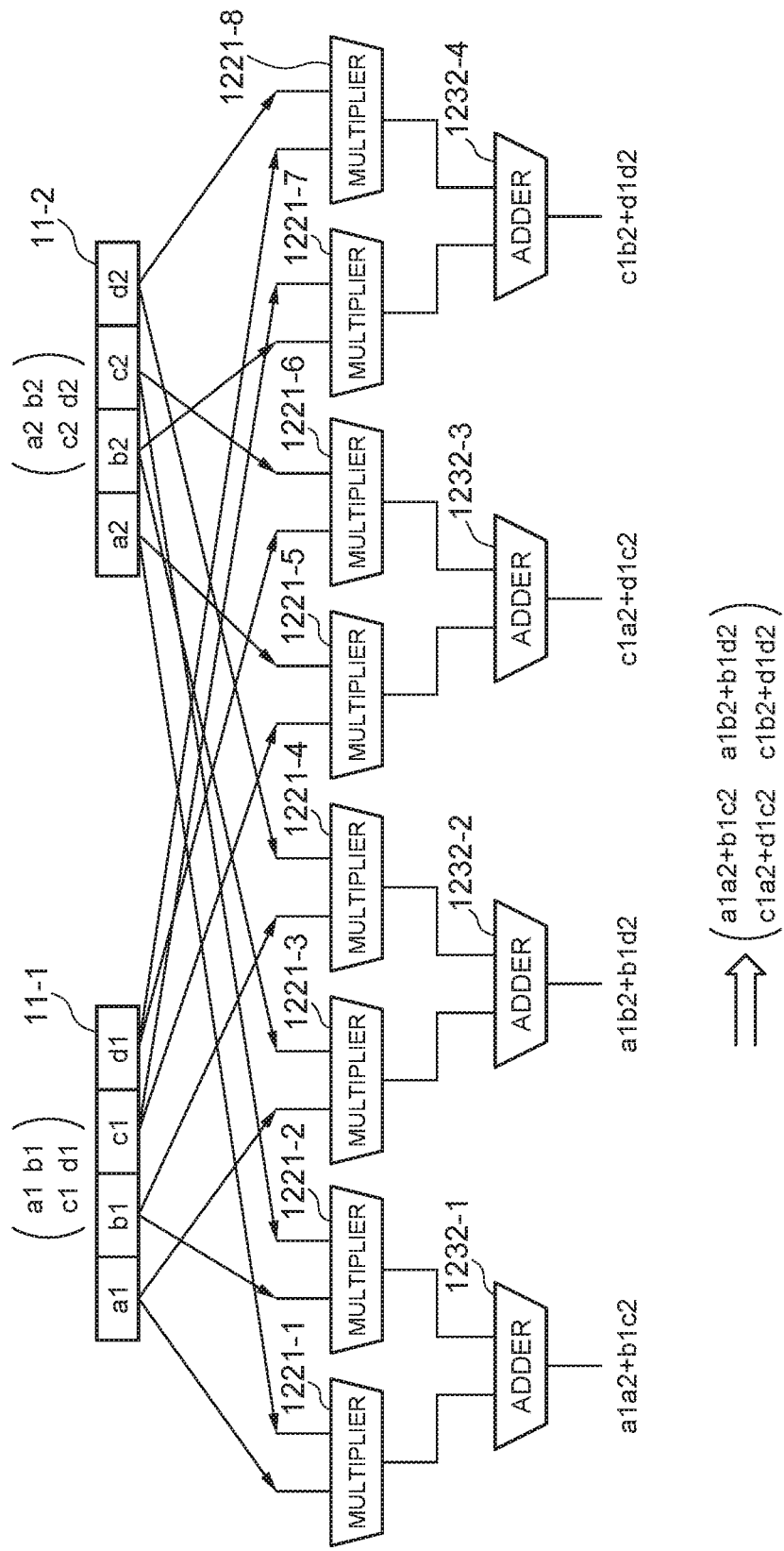
FIG. 14 is a diagram for describing an example of processing when performing multiplication of 2×2 matrices.
Figure 15:
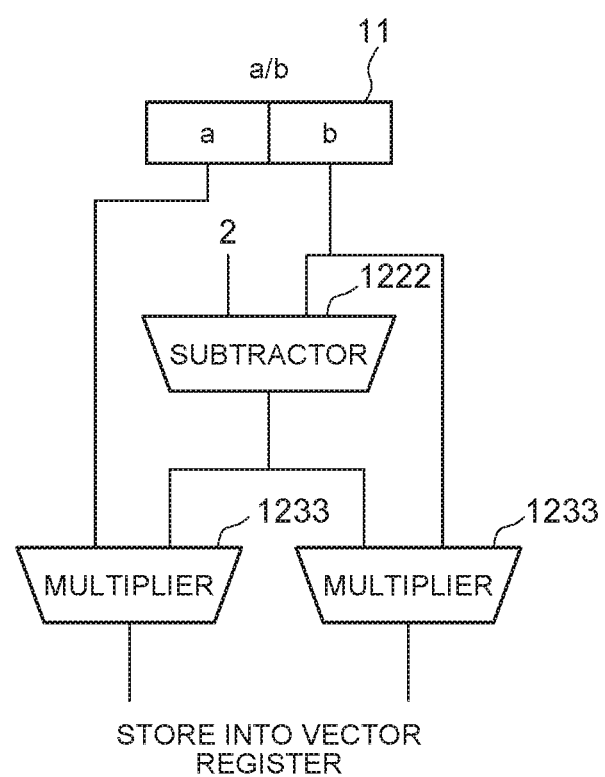
FIG. 15 is a diagram for describing an example of processing when performing division.
Figure 16:
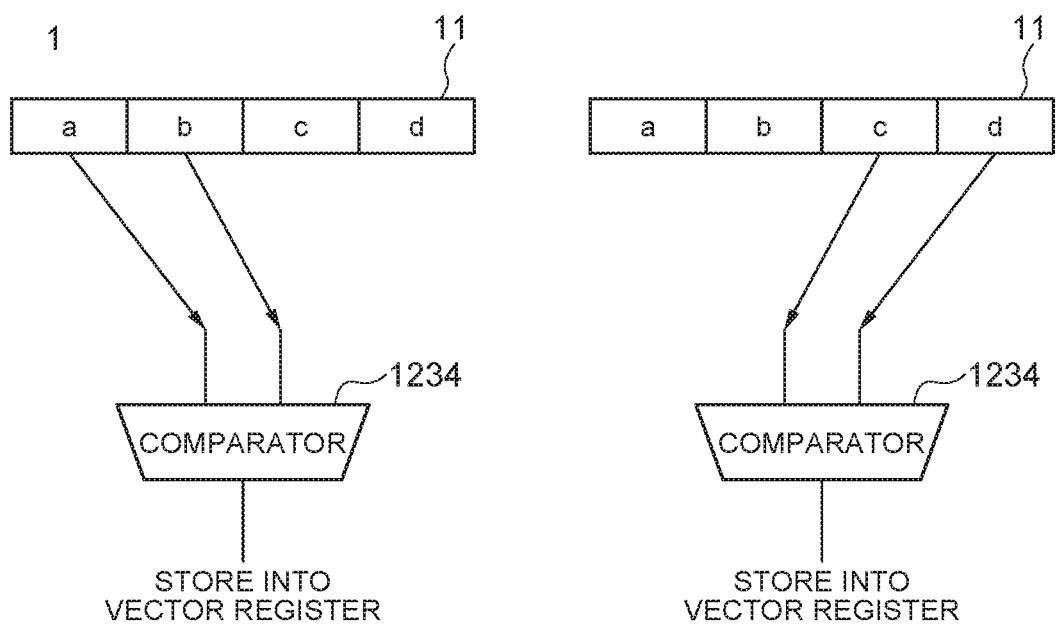
FIG. 16 is a diagram for describing an example of processing when performing a sort.
Figure 16:
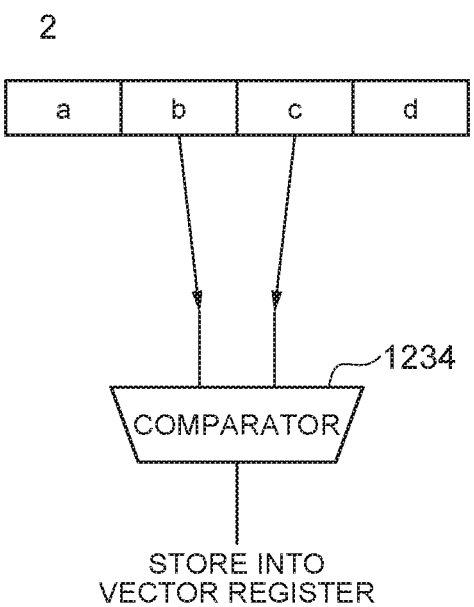
Figure 17:
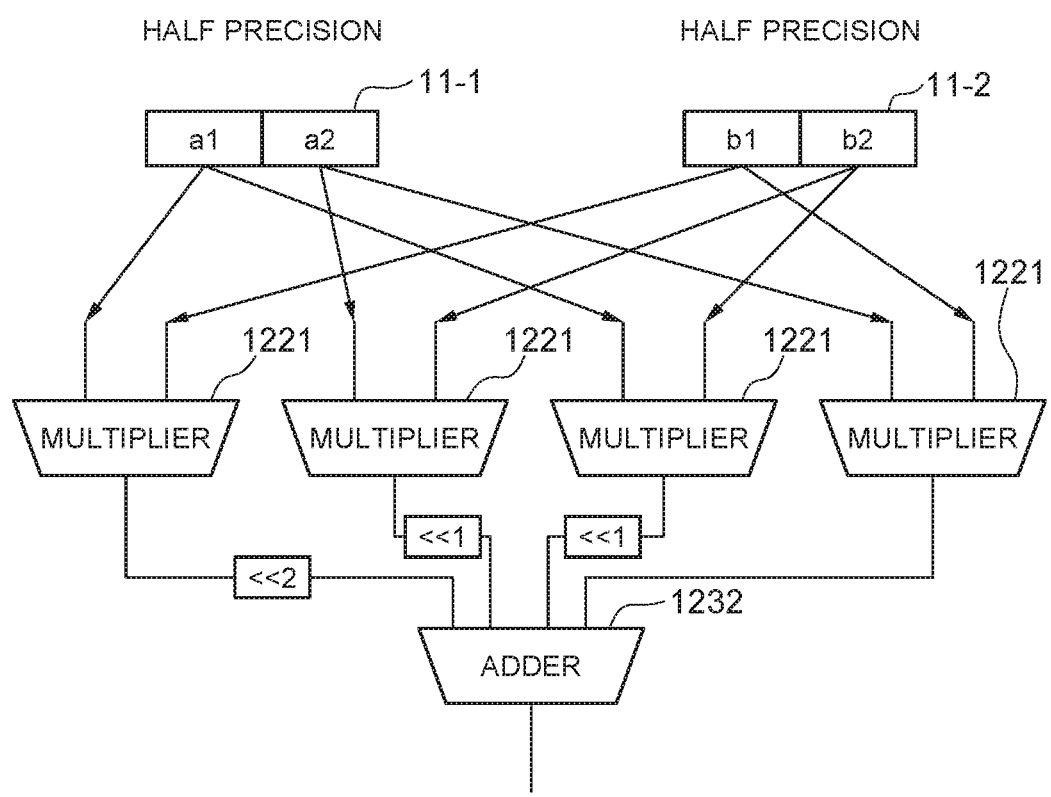
FIG. 17 is a diagram for describing an example of processing when performing multiplication of half-precision data.
Figure 18:
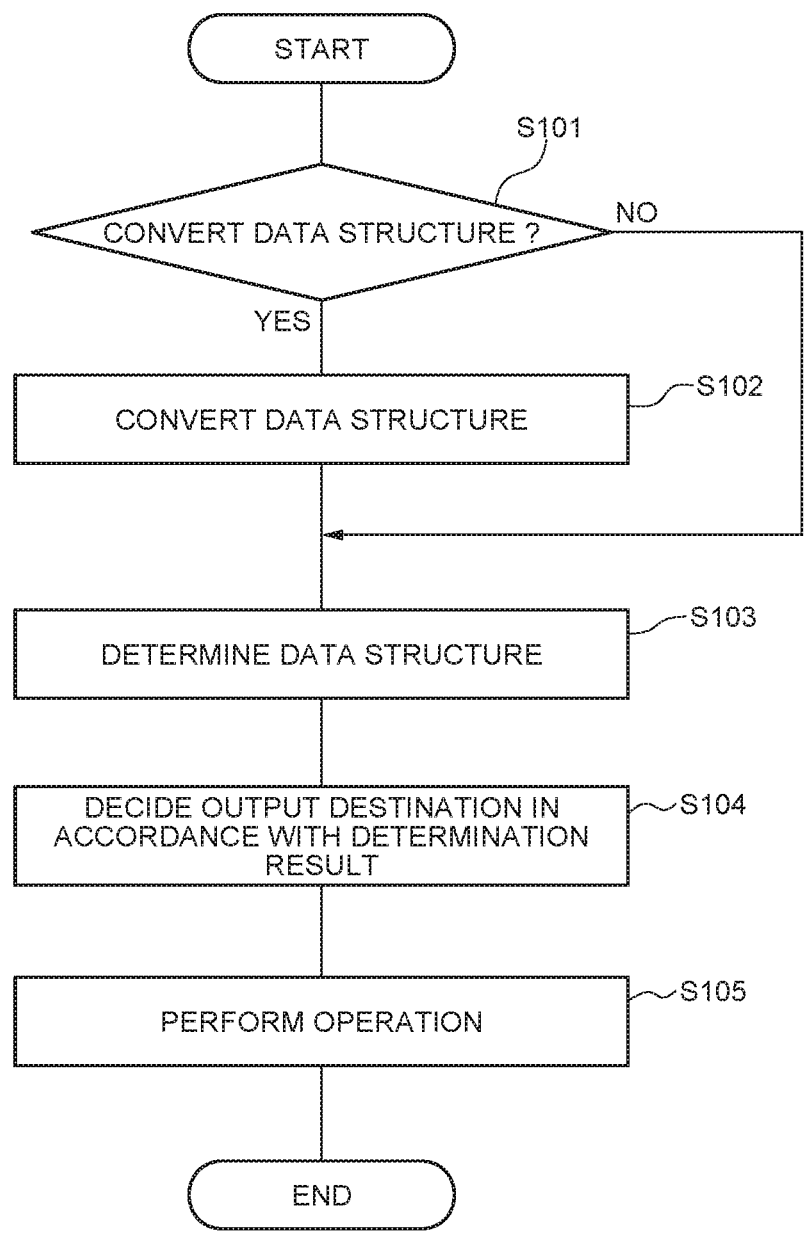
FIG. 18 is a flowchart showing an example of a method for operation processing performed by the vector processor.
Figure 19:
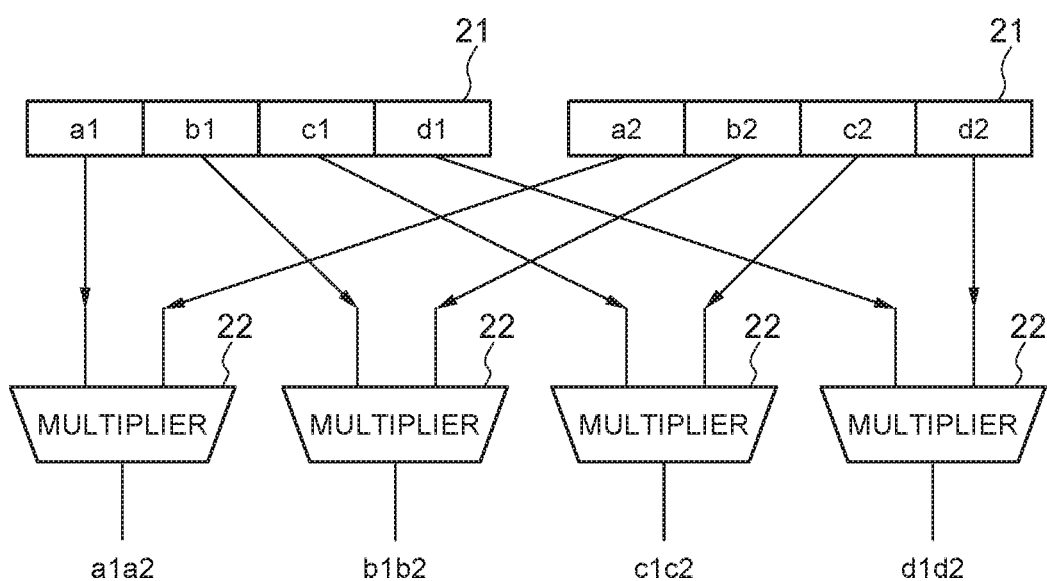
FIG. 19 is a diagram for describing an example of general multiplication processing.

A first example embodiment of the present invention will be described with reference to FIGS. 1 to 19. FIG. 1 a diagram showing an example of the configuration of a vector processor 1. FIG. 2 is a diagram showing an example of the configuration of an operation processing part 12. FIGS. 3 to 12 are views for describing examples of data structure. FIG. 13 is a diagram for describing an example of processing when performing multiplication of complex numbers. FIG. 14 is a diagram for describing an example of processing when performing multiplication of 2×2 matrices. FIG. 15 is a diagram for describing an example of processing when performing division. FIG. 16 is a diagram for describing an example of processing when performing a sort. FIG. 17 is a diagram for describing an example of processing when performing multiplication of half-precision data. FIG. 18 is a flowchart showing an example of a method for operation processing performed by the vector processor 1. FIG. 19 is a diagram for describing an example of general multiplication processing In the first example embodiment, the vector processor 1 that performs an operation in response to an instruction by using elements stored in a vector register 11 serving as a temporal storage device will be described. As will be described later, the vector processor 1 is configured to collectively handle a plurality of elements of the vector register 11 as one element in response to an instruction. With such a configuration, it is possible to handle various types of data, such as half-precision, single-precision, double-precision, a matrix, a complex number, a quaternion and a polynomial, as one element.

The vector processor 1 performs operation processing in response to an instruction. As will be described later, when performing the operation processing, the vector processor 1 collectively handles a plurality of elements of the vector register 11 as one element. In other words, the vector processor 1 defines a data type for elements of the vector register based on an instruction.

FIG. 1 shows an example of the configuration of the vector processor 1. With reference to FIG. 1, the vector processor 1 has a plurality of vector registers 11, the operation processing part 12, a converting part 13, a data type determining part 14, and a selector 15.

The vector processor 1 has an operation device and a storage device, which are not shown in the drawings. The vector processor 1 realizes the converting part 13, the data type determining part 14 and the selector 15 by execution of a program stored in the storage device (not shown) by the operation device. Each of the processing parts described above may be realized by an operation circuit, or the like.

The vector register 11 is a temporary storage device that retains a plurality of elements. For example, the vector register 11 can retain 256 elements. The vector register 11 retains a plurality of elements which have been acquired by the vector processor 1 from a main storage and represent vector data to be used for an operation, for example.

The vector register 11 is configured to be able to output the respective elements stored in the vector register 11 to a plurality of operation units included by the operation processing part 12. For example, assuming that the operation processing part 12 has an upstream operation unit group (for example, operation units 122 shown in FIG. 2) and a downstream operation unit group (for example, operation units 123 shown in FIG. 2), the vector register 11 is connected to all the operation units 122 composing the upstream operation unit group so as to be able to communicate. In other words, as shown in FIG. 2, the vector register 11 has input paths to all the operation units 122 composing the upstream operation unit group. With such a configuration, the respective elements stored in the vector register 11 can be output to any ports of the upstream operation units. Moreover, the respective elements stored in the vector register 11 can be output to a plurality of operation units.

Further, the vector register 11 is configured to be able to input operation results from a plurality of operation units included in the operation processing part 12. For example, in the same manner as described above, assuming that the operation processing part 12 has the upstream operation unit group (for example, the operation units 122 shown in FIG. 2) and the downstream operation unit group (for example, the operation units 123 shown in FIG. 2), the vector register 11 is connected to all the operation units 123 composing the downstream operation unit group so as to be able to communicate. In other words, as shown in FIG. 2, the vector register 11 has input paths from all the operation units 123 composing the downstream operation unit group. With such a configuration, the operation units 123 of the downstream operation units can store operation results to any elements of any vector registers 11.

Thus, the vector register 11 retains a plurality of elements. Moreover, the vector register 11 is configured to be able to output an element to any operation unit of operation units included by the operation processing part 12 (for example, in a case where the operation processing part 12 includes an upstream operation unit group and a downstream operation unit group, any operation unit of the upstream operation units). Moreover, the vector register 11 is configured to be able to receive operation results from the respective operation units 123 of the downstream operation units. Control is performed by the selector 15 to be described later. Output destination control for deciding what port of what operation unit 122 the element is output to is performed by the selector 15 to be described later.

In this example embodiment, it is defined that one element of the vector register 11 is 1 byte. However, one element of the vector register 11 may be other than 1 byte.

The operation processing part 12 performs operation processing by using the elements stored in the vector register 11.

FIG. 2 shows an example of the configuration of the operation processing part 12. With reference to FIG. 2, the operation processing part 12 includes a plurality of registers 121, a plurality of operation units 122, and a plurality of operation units 123. In the above-described configuration, the plurality of operation units 122 compose the upstream operation unit group. In the above-described configuration, the plurality of operation units 123 compose the downstream operation unit group.

As shown in FIG. 2, the respective elements retained by the vector register 11 are output to the operation units 122 composing the upstream operation unit group via the registers 121 serving as read registers. To the operation units 122, elements to be used for an operation are supplied from the registers 121 serving as read registers.

Each of the operation units 122 composing the upstream operation unit group performs an operation using the received elements. The operation unit 122 can include, for example, a multiplier 1221, a subtractor 1222, a comparator, an adder, a shifter, and so on. The operation unit 122 may include only some of the above-exemplified ones, and may include other than the above-exemplified ones.

Each of the operation units 122 composing the upstream operation unit group is connected to all the operation units 123 composing the downstream operation unit group so as to able to communicate. In other words, as shown in FIG. 2, each of the operation units 122 has input paths to all the operation units 123 composing the downstream operation unit group. With such a configuration, each of the operation units 122 can output the result of operation by the operation unit 122 to any port in the downstream operation unit group. Moreover, each of the operation units 122 can transmit the result of operation by the operation unit 122 to the plurality of operation units 123. Output destination control for deciding what port of what operation unit 123 the result is to be output to is performed by the selector 15 to be described later.

Each of the operation units 123 composing the downstream operation unit group performs an operation of data obtained from the operation by the operation units 122. As described above, each of the operation units 122 can transmit the result of operation by the operation unit 122 to the plurality of operation units 123. Therefore, each of the operation units 123 composing the downstream operation unit group can perform an operation of any combination of data obtained from the operation by the operation units 122 composing the upstream operation unit group. The operation unit 123 can include, for example, a subtractor 1231, an adder 1232, a multiplier 1233, a comparator 1234, a shifter, and so on. The operation unit 123 may include only some of the above-exemplified ones, and may include other than the above-exemplified ones.

As described above, each of the operation units 123 composing the downstream operation unit group is connected to each of the plurality of vector registers 11 so as to be able to communicate. In other words, each of the operation units 123 has input paths to all the vector registers 11. With such a configuration, each of the operation units 123 composing the downstream operation unit group can store an operation result into any element of any vector register 11.

The above is an example of the configuration of the operation processing part 12. The operation processing part 12 may have a configuration other than exemplified with FIG. 2. For example, the vector register 11 may have input paths to at least some of the operation units 123. Moreover, the operation processing part 12 may have three or more stages of operation unit groups The converting part 13 performs data type conversion in response to an instruction to be executed in the operation processing part 12. For example, the converting part 13 performs conversion of a data type indicating the number of elements used to express one value, in accordance with the kind of an operation executed in response to an instruction, the target of the operation, or the like.

To be specific, for example, the converting part 13 converts a 1-byte type in which one element is 1 byte shown in FIG. 3, to a half-precision type in which two elements are collectively handled as one element (see FIG. 4). In the case of performing such conversion, the converting part 13 expresses a value expressed with one element before conversion, by using two elements. Moreover, the converting part 13 converts the half-precision type shown in FIG. 4 to a single-precision type in which four elements are collectively handled as one element (see FIG. 5). Moreover, the converting part 13 converts the single-precision type shown in FIG. 5 to a double-precision type in which eight elements are collectively handled as one element. Thus, the converting part 13 can convert the 1-byte type to any of the half-precision type, the single-precision type, the double-precision type and so on, in accordance with the kind of an operation to be executed in response to an instruction, the target of the operation, or the like.

In response to an instruction to be executed in the operation processing part 12, the data type determining part 14 determines what data type the elements retained by the vector register 11 are to be handled in. For example, the data type determining part 14 determines what data type the elements retained by the vector register 11 are to be handled in, in accordance with the kind of an operation to be executed in response to an instruction, the target of the operation, or the like. The data type determined by the data type determining part 14 includes, for example, a data type for indicating the number of elements used to express one value, a data type corresponding to the type of an operation target such as a polynomial or a fraction, and so on. A plurality of elements of the vector register 11 are handled as one element in accordance with the result of determination by the data type determining part 14.

FIGS. 3 to 12 show examples of data type determined by the data type determining part 14. To be specific, FIGS. 3 to 6 show examples of data type indicating the number of elements to be used to express one value, and FIGS. 7 to 12 show examples of data type appropriate for the kind of an operation target, such as a polynomial and a fraction.

FIG. 3 shows an example of the 1-byte type data structure in which one element is 1 byte. When the data structure is the 1-byte type, the maximum vector length is, for example, 256. The 1-byte type data structure is the same as that used conventionally.

FIG. 4 shows an example of the half-precision type data structure in which two elements are collectively handled as one element to express half precision. When the data structure is the half-precision type, one value is expressed by using two elements. When the data structure is the half-precision type, the maximum vector length is, for example, 128.

FIG. 5 shows an example of the single-precision type data structure in which four elements are collectively handled as one element to express single precision. When the data structure is the single-precision type, every four elements from the top are collectively handled as one element. That is, when the data structure is the single-precision type, one value is expressed by using four elements. When the data structure is the single-precision type, the maximum vector length is, for example, 64.

Figure 6:
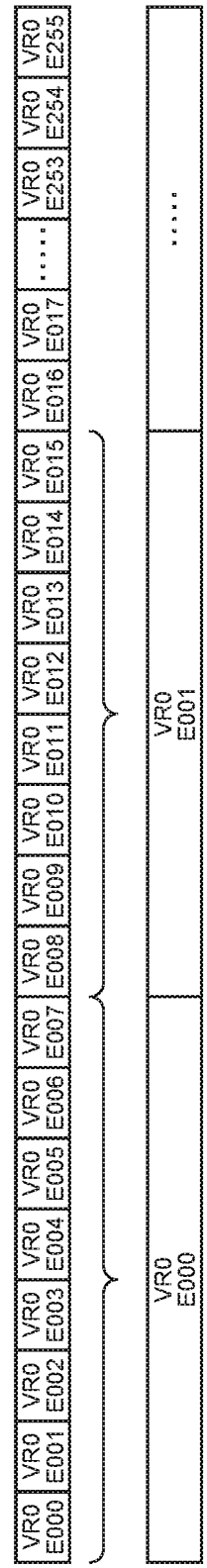
FIG. 6 is a view in which eight elements are collectively handled as one element to express double precision.

FIG. 6 shows an example of the double-precision type data structure in which eight elements are collectively handled as one element to express double precision. When the data structure is the double-precision type, every eight elements from the top are collectively handled as one element. That is, when the data structure is the double-precision type, one value is expressed by using eight elements. When the data structure is the double-precision type, the maximum vector length is, for example, 32.

The above are examples of data type for indicating the number of elements to be used to express one value. As mentioned above, each of the above-described data types is a data type that allows the converting part 13 to convert a data structure in response to an instruction to be executed in the operation processing part 12.

Figure 7:
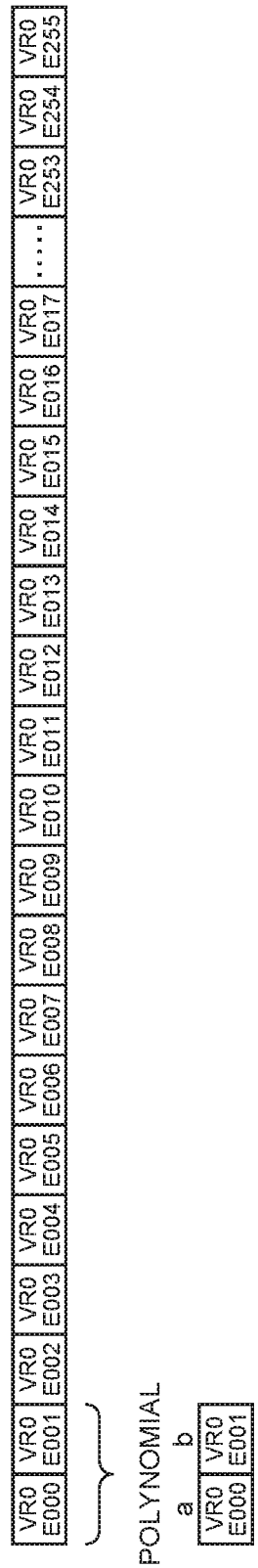
FIG. 7 is a view in which two elements are collectively handled as one element to express a polynomial.

FIG. 7 shows an example of the polynomial type data structure in which two elements are collectively handled as one element to express a polynomial (ax+b). In a case where the data structure is the polynomial type, for example, every two elements from the top are collectively handled as one element. That is, when the data structure is the polynomial type, one polynomial is expressed by using two elements. For example, in the case shown in FIG. 7, one element represents value a, and the other element represents value b, so that one polynomial is expressed by using two elements. When the data structure is the polynomial type as described above, the maximum vector length is 128, for example.

Values a, b and so on of the polynomial type shown in FIG. 7 may be not the 1-byte type as shown in FIG. 7 but a data structure such as the half-precision type, the single-precision type and the double-precision type. For example, in the case of expressing each value of the polynomial type as the half-precision type, value a is expressed by using two elements and value b is expressed by using two elements; that is, one polynomial is expressed by using four elements.

FIG. 8 shows an example of the fraction type data structure in which two elements are collectively handled as one element to express a fraction (a/b). When the data structure is the fractional type, for example, every two elements from the top are collectively handled as one element. That is, when the data structure is the fractional type, one fraction is expressed by using two elements. For example, in the case shown in FIG. 8, one element represents value a and the other element represents value b, so that one fraction is expressed by using two elements. When the data structure is the fraction type as described above, the maximum vector length is 128, for example.

As in the case of the polynomial type, values such as a, b and so on of the fraction type shown in FIG. 8 may be a data structure such as the half-precision type, the single-precision type and the double-precision type.

FIG. 9 shows an example of the complex-number type data structure in which two elements are collectively handled as one element to express a complex number (a+bi). When the data structure is the complex-number type, for example, every two elements from the top are collectively handled as one element. That is, when the data structure is the complex-number type, one complex number is expressed by using two elements. For example, in the case shown in FIG. 9, one element represents value a and the other element represents value b, so that one complex number is expressed by using two elements. When the data structure is the complex-number type as described above, the maximum vector length is 128, for example.

As in the case of the polynomial type and the fraction type, values a, b and so on of the fractional type shown in FIG. 9 may be a data structure such as the half-precision type, the single-precision type and the double-precision type.

Figure 10:
FIG. 10 is a view in which four elements are collectively handled as one element to express a quaternion.

FIG. 10 shows an example of the quaternion type data structure in which four elements are collectively handled as one element to express a quaternion (a+bi+cj+dk). In a case where the data structure is the quaternion type, for example, every four elements from the top are collectively handled as one element. That is, in a case where the data structure is the quaternion type, one quaternion is expressed by using four elements. For example, in the case shown in FIG. 10, one element represents value a, another one element represents value b, another one element represents value c, and the other one element represents value d, so that one quaternion is expressed by using four elements. In a case where the data structure is the quaternion type as described above, the maximum vector length is, for example, 64.

As in the case of the polynomial type, the fraction type and the complex-number type, values a, b, c, d and so on in the quaternion type shown in FIG. 10 may be a data structure such as the half-decision type, the single-decision type and the double-decision type.

Figure 11:
FIG. 11 is a view in which four elements are handled as one element to express a 2×2 matrix.

FIG. 11 shows an example of the 2×2 matrix type data structure in which four elements are collectively handled as one element to express a 2×2 matrix. In a case where the data structure is the 2×2 matrix type, for example, every four elements from the top are collectively handled as one element. That is, in a case where the data structure is the 2×2 matrix type, one 2×2 matrix is expressed by using four elements. For example, in the case shown in FIG. 11, one element represents value a, another element represents value b, another element represents value c, and the other element represents value d, so that one 2×2 matrix is expressed by using four elements. In a case where the data structure is the 2×2 matrix type as described above, the maximum vector length is, for example, 64.

As in the case of the polynomial type, the fractional type, the complex-number type and the quaternion type, values a, b, c, d and so on of the 2×2 matrix type shown in FIG. 11 may be a data structure such as the half-precision type, the single-precision type and the double-precision type.

FIG. 12 shows an example of the 4×4 matrix type data structure in which sixteen elements are collectively handled as one element to express a 4×4 matrix. In a case where the data structure is the 4×4 matrix type, for example, every sixteen elements from the top are collectively handled as one element. That is, in a case where the data structure is the 4×4 matrix type, one 4×4 matrix is expressed by using sixteen elements. For example, in the case shown in FIG. 12, the respective elements are used to represent values a, b, c, d, e, f, g, h, i, j, k, l, m, n, o and p, so that one matrix is expressed by using sixteen elements. In a case where the data structure is the matrix type as described above, the maximum vector length is, for example, 16.

As in the case of the polynomial type, the fraction type, the complex-number type, the quaternion type and the 2×2 matrix type, values a, b, c, d, e, f, g, h, i, j, k, l, m, n, o, p and so on of the matrix type shown in FIG. 12 may be a data structure such as the half-precision type, the single-precision type and the double-precision type.

The above are examples of data type appropriate for the kind of an operation target. A data type appropriate for the kind of an operation target may include other than the exemplified above. For example, the data type can include a 2×3 matrix type.

The data type determining part 14 determines what data type the elements retained by the vector register 11 are to be handled in among the above-described data types, depending on the kind of an operation to be executed in response to an instruction and the target of an operation. Then, the data type determining part 14 outputs the result of the determination to the selector 15.

The selector 15 decides destinations for output of the respective elements retained by the vector register 11 and destinations for output of the results of operations by the operation unit 122 and the operation unit 123, based on the result of determination by the data type determining part 14 and the kind of an instruction to be executed (for example, the kind of an operation to be executed in response to an instruction). That is, the selector 15 works as an output destination deciding part that decides destinations for output of the elements stored in the vector register 11. By outputting the elements retained by the vector register 11 to the output destinations decided by the selector 15, an operation is performed.

For example, the selector 15 decides what input port of what operation unit 122 each of the elements retained by the vector register 11 is to be input into among the operation units 122 composing the upstream operation unit group. That is, the selector 15 decides a destination for output of each of the elements retained by the vector register 11 so that the operation processing part 12 executes processing appropriate for an instruction based on the result of determination by the data type determining part 14. In accordance with decision by the selector 15, each of the elements retained by the vector register 11 is input into the decided port.

Further, the selector 15 decides what port of what operation unit 123 the result of an operation by each of the operation units 122 composing the upstream operation unit group is to be output to, based on the result of determination by the data type determining part 14. That is, the selector 15 decides a destination for output of the result of an operation by the operation unit 122 so that the operation processing part 12 executes processing appropriate for an instruction, based on the result of determination by the data type determining part 14. In accordance with determination by the selector 15, the result of an operation by the operation unit 122 is input into the decided port.

Further, the selector 15 decides what element of what vector register 11 the result of an operation by each of the operation units 123 composing the downstream operation unit group is to be stored into, based on the result of determination by the data type determining part 14.

With reference to FIGS. 13 to 17, an example of processing when performing a specific operation will be described.

With this, a specific example of control of an output destination decided by the selector 15 will be described.

FIG. 13 shows a case in which multiplication of complex numbers is performed. To be specific, a case of performing an operation of (a+bi)×(c+di) is exemplified. With reference to FIG. 13, in the case of performing multiplication of complex numbers, the data type determining part 14 determines to handle the elements retained by the vector registers 11 as a complex-number type data structure in which two elements are collectively handled as one element to express a complex number. For example, the data type determining part 14 determines that one element of the vector register 11-1 expresses value a, subsequent one element expresses value b, and the two elements are combined to express one complex number (a+bi). Also, the data type determining part 14 determines that one element of the vector register 11-2 expresses value c, subsequent one element expresses value d, and the two elements are combined to express one complex number (c+di).

The selector 15 decides a port to be a destination for output of each element depending on the result of determination by the data type determining part 14 and the kind of an instruction to be executed (in this case, multiplication of complex numbers). For example, the selector 15 decides to output the element expressing the value a and the element expressing the value c to a multiplier 1221-1. Also, the selector 15 decides to output the element expressing the value b and the element expressing the value d to a multiplier 1221-2. As a result of the above, ac is calculated by the multiplier 1221-1, and bd is calculated by the multiplier 1221-2. Moreover, the results of the operations by the multipliers 1221-1 and 1221-2 are output to a subtractor 1231 in accordance with the decision by the selector 15. Consequently, the subtractor 1231 calculates ac−bd. Likewise, the selector 15 decides output destinations, so that ad+bc is calculated by a multiplier 1221-3, a multiplier 1221-4, and an adder 1232. As a result, in the vector registers 11, ac−bd is stored as one element, and ad+bc is stored as subsequent one element. As mentioned above, in the case shown in FIG. 13, the data type determining part 14 determines to handle the elements retained by the vector registers 11 as a complex-number type data structure in which two elements are collectively handled as one element to express a complex number. Therefore, the two elements retained by the vector registers 11 express a complex number of ac−bd+(ad+bc)i.

As described above, in multiplication of complex numbers each having a vector length 2, multiplication is performed four times, addition is performed one time, and subtraction is performed one time. That is, six operations are performed in total.

FIG. 14 shows a case in which multiplication of 2×2 matrices is performed. With reference to FIG. 14, in the case of performing multiplication of 2×2 matrices, the data type determining part 14 determines to handle the elements retained by the vector registers 11 as a 2×2 matrix type data structure in which four elements are collectively handled as one element to express a 2×2 matrix. For example, the data type determining part 14 determines that the respective elements of the vector register 11-1 express value a1, value b1, value c1 and value d1, and the four elements are combined to express one 2×2 matrix. Also, the data type determining part 14 determines that the respective elements of the vector register 11-2 express value a2, value b2, value c2 and value d2, and the four elements are combined to express one 2×2 matrix.

The selector 15 decides a port to be a destination for output of each element depending on the result of determination by the data type determining part 14 and the kind of an instruction to be executed (in this case, multiplication of 2×2 matrices). The selector 15 decides output destinations and then a1a2+b1c2 is calculated by a multiplier 1221-1, a multiplier 1221-2, and an adder 1232-1. Likewise, a1b2+b1d2 is calculated by a multiplier 1221-3, a multiplier 1221-4, and an adder 1232-2. Also, c1a2+d1c2 is calculated by a multiplier 1221-5, a multiplier 1221-6, and an adder 1232-3. Also, c1b2+d1d2 is calculated by a multiplier 1221-7, a multiplier 1221-8, and an adder 1232-4. As a result, in the vector register 11, a1a2+b1c2 is stored as one element, a1b2+b1d2 is stored as subsequent one element, c1a2+d1c2 is stored as subsequent one element, and c1b2+d1d2 is stored as subsequent one element. As described above, in the case shown in FIG. 14, the data type determining part 14 determines to handle the elements retained by the vector registers 11 as a 2×2 matrix type data structure in which four elements are collectively handled as one element to express a 2×2 matrix. Therefore, the four elements retained by the vector register 11 express the result of multiplication of 2×2 matrices.

Thus, in multiplication of 2×2 matrices each having a vector length 4, multiplication is performed eight times, and addition is performed four times. That is, twelve operations are performed in total.

FIG. 15 shows a case in which division (a/b) is performed. In the case of performing division, it is determined that two elements are combined to express one division, based on the result of determination by the data type determining part 14. For example, in the case shown in FIG. 15, two elements are collectively handled as one element, the dividend a is stored in the former element and the divisor b is stored in the latter element. In accordance with the determination of the output destination by the selector 15, the operation processing part 12 performs an operation.

FIG. 15 shows a case of using an algorithm called Goldschmidt division that allows for division only by multiplication. By repeating the operation shown in FIG. 15 several times, it is possible to obtain a division result. The number of repetitions of the operation shown in FIG. 15 is changed depending on the precision.

FIG. 16 shows a case where sort is performed. FIG. 16 shows a case where bubble sort is used. In the case of using bubble sort, sort in the vector register 11 is performed by executing operations 1 and 2 in FIG. 16 (the number of the elements−1) times.

In the case of performing sort, it is possible to perform sort based on the result of determination by the data type determining part 14. For example, in a case where the data type determining part 14 determines that the data type is the complex-number type in which two elements are combined to express one complex number (c+di), it is possible to regard two elements determined to express one complex number as one element and perform sort on each one element expressed by two elements.

FIG. 17 shows a case where multiplication of half-precision data is performed. In the case shown in FIG. 17, one value is expressed by using two elements. For example, in the case shown in FIG. 17, the data type determining part 14 determines that a multiplicand is expressed by using two elements retained by the vector register 11-1. Also, the data type determining part 14 determines that a multiplier is expressed by using two elements retained by the vector register 11-2.

The selector 15 decides a port to be a destination for output of each element in accordance with the result of determination by the data type determining part 14 and the kind of an instruction to be executed (multiplication of half-precision data). In the case of performing multiplication of half-precision data, the operation result can be obtained by using four 8-bit multipliers 1221, a shifter for adjusting the number of digits, and an adder 1232 for adding operation results.

In the case of performing multiplication of single-precision data or double-precision data, it is also possible to realize by combining a plurality of multipliers, a shifter and an adder to perform operations as in the case of multiplication of half-precision data.

As described above, the selector 15 decides destinations for output of the respective elements retained by the vector registers 11 and the results of operations by the operation unit 122 and the operation unit 123, based on the result of determination by the data type determining part 14 and the kind of an instruction to be executed.

The above are examples of the configuration of the vector processor 1. Next, with reference to FIG. 18, an example of an operation performing method executed by the vector processor 1 will be described.

The vector processor 1 acquires vector data to be used for operation from a main storage and stores the data into the vector register 11. Consequently, the vector register 11 retains a plurality of elements representing the vector data to be used for operation.

With reference to FIG. 18, the converting part 13 determines whether or not to perform data structure conversion depending on, for example, the kind of an operation to be executed by using the elements retained by the vector register 11 (step S101). In the case of determining to perform data structure conversion (step S101, Yes), the converting part 13 performs data structure conversion by converting the 1-byte type to any of the half-precision type, the single-precision type, the double-precision type, and so on. On the other hand, in the case of determining not to perform data structure conversion (step S101, No), the converting part 13 does not perform the data structure conversion.

The data type determining part 14 determines what data type the elements retained by the vector register 11 are to be handed as, in accordance with an instruction to be executed in the operation processing part 12 (step S103). The data type determined by the data type determining part 14 is, for example, a data type for indicating how many elements are used to express one value, a data type appropriate for the kind of an operation target such as a multinomial and a fraction, and so on. Then, the data type determining part 14 outputs the result of determination to the selector 15.

The selector 15 decides destinations for output of the respective elements retained by the vector register 11 and destinations for output of the results of operations by the operation unit 122 and the operation unit 123, based on the result of determination by the data type determining part 14 and the kind of an instruction to be executed (step S104).

Based on decision by the selector 15, the respective elements retained by the vector register 11 are output to the operation unit 122 and the operation unit 123 included by the operation processing part 12. Consequently, the operation processing part 12 executes operations (step S105). After that, the operation processing part 12 outputs the operation results to the vector register 11.

The above is an example of an operation performing method executed by the vector processor 1.

Thus, the vector processor 1 in this example embodiment has the data type determining part 14 and the selector 15. With such a configuration, the selector 15 can decide a destination for output of each element retained by the vector register 11, based on the result of determination by the data type determining part 14 and the kind of an instruction to be executed. As a result, the vector processor 1 can perform an operation based on the result of combining a plurality of elements as one element.

In multiplication of semi-precision data, single-precision data, double-precision data, matrices, complex numbers, quaternions, polynomials, or the like, one or more operations are performed on the same data. Therefore, according to the above configuration, even when the B/F (Byte/Flop) value is small, it is possible to efficiently use the operation units, and it is possible to improve the performance.

FIG. 19 shows an example of normal multiplication using vector registers 21 each having a vector length 4. As shown in FIG. 19, in the case of normal multiplication, it is possible to perform multiplication on each element. That is, in normal multiplication, it is possible to perform four operations by using four multipliers 22. On the other hand, for example, in the case of multiplication of 2×2 matrix type data expressing 2×2 matrices in the vector registers 11 each having a vector length 4, it is possible to perform eight multiplications and four additions to perform twelve operations in total (see FIG. 14). Comparing normal multiplication and multiplication of 2×2 matrices, the number of elements used for operands is the same, but the number of operations in normal multiplication is four, whereas the number of operations in multiplication of 2×2 matrices is eleven. In other words, it can be seen that in multiplication of 2×2 matrix type data, it is possible to perform operations three times as many as in normal multiplication. Thus, by defining a data type for elements retained by the vector register 11, it is possible to express various data types. As a result, even when the B/F value is small, it is possible to efficiently use the operation unit and improve the performance.

Second Example Embodiment

Figure 20:
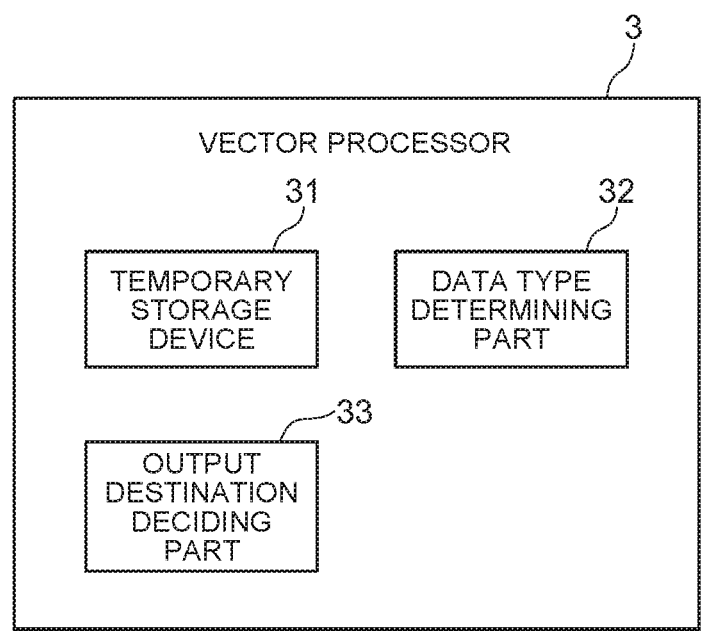
FIG. 20 is a block diagram showing an example of the configuration of a vector processor according to a second example embodiment of the present invention.

Next, with reference to FIG. 20, a second example embodiment of the present invention will be described. In the second example embodiment, the overview of the configuration of a vector processor 3 will be described.

The vector processor 3 performs an operation by outputting each element to an output destination decided by an output destination deciding part 33 to be described later. FIG. 20 shows an example of the configuration of the vector processor 3. With reference to FIG. 20, the vector processor 3 has a temporary storage device 31, a data type determining part 32, and the output destination deciding part 33. The vector processor 3 has an operation device and a storage device, which are not shown in the drawings. The vector processor 3 realizes the data type determining part 32 and the output destination deciding part 33 by execution of a program stored in the storage device (not shown) by the operation device.

The temporary storage device 31 retains a plurality of elements representing data to be used at the time of performing an operation appropriate for an instruction.

The data type determining part 32 determines what data type the elements retained by the temporary storage device 31 are to be handled as among predetermined data types. Moreover, the output destination deciding part 33 decides destinations for output of the elements stored by the temporary storage device 31, based on the result of determination by the data type determining part 32. As described above, the vector processor 3 outputs the respective elements to the output destinations decided by the output destination deciding part 33 and thereby performs an operation.

Thus, the vector processor 3 in this example embodiment has the data type determining part 32 and the output destination deciding part 33. With such a configuration, the output destination deciding part 33 can decide destinations for output of the elements stored by the temporary storage device 31, based on the result of determination by the data type determining part 32. As a result, the vector processor 3 can perform an operation based on the result of combining a plurality of elements as one element. Consequently, it is possible to efficiently use an operation unit, and it is possible to increase the performance.

Further, the vector processor 3 described above can be realized by installation of a predetermined program into the vector processor 3. To be specific, a program as another aspect of the present invention is a program including instructions for causing a vector processor including a temporary storage device 31 configured to retain a plurality of elements representing data used at a time of performing an operation appropriate for an instruction, to realize: a data type determining part 32 configured to determine what data type the elements retained by the temporary storage device 31 are to be handled as among predetermined data types, in accordance with the instruction; and an output destination deciding part 33 configured to decide an output destination of each of the elements stored by the temporary storage device 31, based on a result of determination by the data type determining part 32. The program includes instructions for causing the vector processor to output each of the elements to the output destination decided by the output destination deciding part 33, thereby performing the operation.

Further, an operation performing method executed by the vector processor 3 described above is a method executed by a vector processor including a temporary storage device 31 configured to retain a plurality of elements representing data used at a time of performing an operation appropriate for an instruction. The operation performing method includes: determining what data type the elements retained by the temporary storage device 31 are to be handled as among predetermined data types, in accordance with the instruction; deciding an output destination of each of the elements stored by the temporary storage device 31, based on a result of determination by the data type determining part; and outputting each of the elements the output destination decided by the output destination deciding part, thereby performing the operation.

The inventions of the program and the operation performing method with the abovementioned configurations also have the same actions as the vector processor 3 described above, and therefore, can achieve the object of the present invention described above.

<Supplementary Notes>

The whole or part of the example embodiments disclosed above can be described as the following supplementary notes. The outline of a vector processor and so on according to the present invention will be described below. However, the present invention is not limited to the following configurations.

(Supplementary Note 1)

A vector processor comprising:

a temporary storage device configured to retain a plurality of elements representing data used at a time of performing an operation appropriate for an instruction;

a data type determining part configured to determine what data type the elements retained by the temporary storage device are to be handled as among predetermined data types, in accordance with the instruction; and an output destination deciding part configured to decide an output destination of each of the elements stored by the temporary storage device, based on a result of determination by the data type determining part, the vector processor being configured to output each of the elements to the output destination decided by the output destination deciding part, thereby performing the operation.

(Supplementary Note 2)

The vector processor according to Supplementary Note 1, wherein the data type determining part is configured to determine the data type in accordance with the instruction, thereby handling a plurality of elements stored by the temporary storage device as one element.

(Supplementary Note 3)

The vector processor according to Supplementary Note 1 or 2, wherein the data type determining part is configured to determine what data type the elements are to be handled as among data types each indicating how many elements are used to express one value, in accordance with the instruction.

(Supplementary Note 4)

The vector processor according to any one of Supplementary Notes 1 to 3, wherein the data type determining part is configured to determine what data type the elements are to be handled as among data types each corresponding to a kind of an operation target, in accordance with the instruction.

(Supplementary Note 5)

The vector processor according to any one of Supplementary Notes 1 to 4, wherein the output destination deciding part is configured to decide an output destination of each of the elements stored by the temporary storage device, based on the result of determination by the data type determining part and a kind of the instruction.

(Supplementary Note 6)

The vector processor according to any one of Supplementary Notes 1 to 5, further comprising an operation processing part configured to perform the operation by using each of the elements stored by the temporary storage device, wherein the output destination deciding part is configured to decide what port of what operation unit each of the elements stored by the temporary storage device is to be output to among operation units included by the operation processing part, based on the result of determination by the data type determining part.

(Supplementary Note 7)

The vector processor according to Supplementary Note 6, wherein each of the operation units included by the operation processing part is connected to the temporary storage device so as to be able to communicate.

(Supplementary Note 8)

The vector processor according to any one of Supplementary Notes 1 to 7, further comprising a converting part configured to convert a data type indicating how many elements are used to express one value among data types of the elements retained by the temporary storage device.

(Supplementary Note 9)

An operation performing method executed by a vector processor including a temporary storage device configured to retain a plurality of elements representing data used at a time of performing an operation appropriate for an instruction, the operation performing method comprising:

determining what data type the elements retained by the temporary storage device are to be handled as among predetermined data types, in accordance with the instruction;

deciding an output destination of each of the elements stored by the temporary storage device, based on a result of determination by the data type determining part; and outputting each of the elements the output destination decided by the output destination deciding part, thereby performing the operation.

(Supplementary Note 10)

A non-transitory computer-readable recording medium for recording a program comprising instructions for causing a vector processor including a temporary storage device configured to retain a plurality of elements representing data used at a time of performing an operation appropriate for an instruction, to realize:

a data type determining part configured to determine what data type the elements retained by the temporary storage device are to be handled as among predetermined data types, in accordance with the instruction; and an output destination deciding part configured to decide an output destination of each of the elements stored by the temporary storage device, based on a result of determination by the data type determining part, the program comprising instructions for causing the vector processor to output each of the elements to the output destination decided by the output destination deciding part, thereby performing the operation.

The program described in the example embodiments and the supplementary notes is stored in a storage device or recorded on a non-transitory computer-readable recording medium. For example, the recording medium is a portable medium such as a flexible disk, an optical disk, a magneto-optical disk and a semiconductor memory.

Although the present invention has been described above with reference to the example embodiments, the present invention is not limited to the example embodiments. The configurations and details of the present invention can be changed in various manners that can be understood by one skilled in the art within the scope of the present invention.

DESCRIPTION OF REFERENCE NUMERALS 1 vector processor
11 vector register
12 operation processing part
121 register
122 operation unit
1221 multiplier
1222 subtractor
123 operation unit
1231 subtractor
1232 adder
1233 multiplier
1234 comparator
13 converting part
14 data type determining part
15 selector
21 vector register
22 multiplier
3 vector processor
31 temporary storage device
32 data type determining part
33 output destination deciding part

The invention claimed is:

1. A vector processor comprising:
a temporary storage device configured to retain a plurality of elements representing data used at a time of performing an operation appropriate for an instruction:
a data type determining part configured to determine what data type the elements retained by the temporary storage device are to be handled as among predetermined data types, in accordance with the instruction: and
an output destination deciding part configured to decide an output destination of each of the elements stored by the temporary storage device, based on a result of determination by the data type determining part,
the vector processor being configured to output each of the elements to the output destination decided by the output destination deciding part, thereby performing the operation,
the data type determining part configured to determine what data type the elements are to be handled as among data types each corresponding to a kind of an operation target, in accordance with the instruction.

2. The vector processor according to claim 1, wherein the data type determining part is configured to determine the data type in accordance with the instruction, thereby handling a plurality of elements stored by the temporary storage device as one element.

3. The vector processor according to claim 1, wherein the data type determining part is configured to determine what data type the elements are to be handled as among data types each indicating how many elements are used to express one value, in accordance with the instruction.

4. The vector processor according to claim 1, wherein the output destination deciding part is configured to decide an output destination of each of the elements stored by the temporary storage device, based on the result of determination by the data type determining part and a kind of the instruction.

5. The vector processor according to claim 1, further comprising an operation processing part configured to perform the operation by using each of the elements stored by the temporary storage device,
wherein the output destination deciding part is configured to decide what port of what operation unit each of the elements stored by the temporary storage device is to be output to among operation units included by the operation processing part, based on the result of determination by the data type determining part.

6. The vector processor according to claim 5, wherein each of the operation units included by the operation processing part is connected to the temporary storage device so as to be able to communicate.

7. The vector processor according to claim 1, further comprising a converting part configured to convert a data type indicating how many elements are used to express one value among data types of the elements retained by the temporary storage device.

8. An operation performing method executed by a vector processor including a temporary storage device configured to retain a plurality of elements representing data used at a time of performing an operation appropriate for an instruction, the operation performing method comprising:
determining what data type the elements retained by the temporary storage device are to be handled as among predetermined data types, in accordance with the instruction;
deciding an output destination of each of the elements stored by the temporary storage device, based on a result of determination by the data type determining part; and
outputting each of the elements the output destination decided by the output destination deciding part, thereby performing the operation,
determining what data type the elements are to be handled as among data types each corresponding to a kind of an operation target, in accordance with the instruction.

9. A non-transitory computer-readable recording medium for recording a program comprising instructions for causing a vector processor including a temporary storage device configured to retain a plurality of elements representing data used at a time of performing an operation appropriate for an instruction, to realize:
a data type determining part configured to determine what data type the elements retained by the temporary storage device are to be handled as among predetermined data types, in accordance with the instruction; and
an output destination deciding part configured to decide an output destination of each of the elements stored by the temporary storage device, based on a result of determination by the data type determining part,
the program comprising instructions for causing the vector processor to output each of the elements to the output destination decided by the output destination deciding part, thereby performing the operation,
the data type determining part configured to determine what data type the elements are to be handled as among data types each corresponding to a kind of an operation target, in accordance with the instruction.

* * * * *